Patented June 23, 1925.

1,543,458

UNITED STATES PATENT OFFICE.

JOKICHI TAKAMINE, JR., OF CLIFTON, NEW JERSEY, ASSIGNOR TO TAKAMINE FERMENT CO., OF NEW YORK, N. Y., A CORPORATION OF WEST VIRGINIA.

STARCH-FREE BRAN AND METHOD OF MAKING THE SAME.

No Drawing.   Application filed September 14, 1922. Serial No. 588,186.

*To all whom it may concern:*

Be it known that I, JOKICHI TAKAMINE, Jr., subject of the Emperor of Japan, and resident of Clifton, in the county of Passaic and State of New Jersey, have invented certain new and useful Improvements in Starch-Free Bran and Methods of Making the Same, of which the following is a specification.

It has long been known that diabetics should not take starchy materials or sugars into their systems. Furthermore, when a diet devoid of these substances is taken, their effect is to cause constipation. Recently it has been found that bran, particularly wheat bran, has a laxative action due to its comparative non-digestibility and its bulk, but it contains starchy material which is converted into sugar in the human system, and in its natural state is therefore detrimental, especially to people suffering from such diseases as diabetes, or wherever taking starch into the system is undesirable.

I have discovered that bran free from starch or other sugar forming material may be produced and used as a laxative agent without the loss of any of its natural laxative properties. I have also discovered a method by which bran may be so treated as to remove the starch or other sugar forming materials without impairing its natural laxative properties.

Broadly considered my method is as follows:

The bran is steamed or cooked at 100° C. or over to open up the starch cells; the mass is then macerated with water in the presence of an agent for converting the starch into water soluble products, agitation being preferable at this time; a sample may be drawn off and when there is no blue coloration upon the addition of iodine, the mass is then in condition for the liquid to be drawn off; the liquid is drawn off and the mass thoroughly washed with fresh water to remove resulting sugars and other soluble and colloidal products; the mass is filtered or pressed to remove the excess moisture and is then dried.

The following specific examples will be helpful in further understanding my method:

*Example 1.*—10 pounds of bran are steamed and cooked at 100° C. or over to open up the starch cells so that they are in proper form for conversion into water soluble substances. Wheat bran usually contains about 20% starch. With such bran about $\frac{1}{50}$ of a pound of diastatic enzyme, for example, polyzime or malt extract, is added to the 10 pounds as above treated, the mass being macerated with water, as a result of which the starch is rendered water soluble. The water with soluble products is then drawn off and the mass thoroughly washed with fresh water to remove completely the soluble products, including dextrines and sugars. The material is then filtered or pressed to remove the excess moisture and then dried.

*Example 2.*—10 pounds of bran are steamed and cooked as set forth in Example 1. To this mass are added and intimately mixed therewith, water and the spores of some enzyme producing fungus, such as Aspergillus oryzæ. The mass is allowed to stand under suitable conditions, when growth of the fungus takes place. This growth may continue from 36 to 48 hours and may take place while the material is at rest or while it is being agitated. After a growth of about 36 to 48 hours, the mass is macerated with water at room temperature and in such quantity as to make the mass easily workable. This brings the enzymes into solution in the water and the starchy material of the bran is converted into water soluble starch, dextrine and sugar. When a sample shows no blue coloration upon the addition of iodine, the liquid may be drawn off. The liquid which contains the enzymic properties may be saved and used in various arts. The mass is then thoroughly washed with fresh water to remove the dextrines and sugars. The mass is then filtered or pressed to remove the excess moisture and is subsequently dried.

The product resulting from the above process contains practically no starch or sugars or other material which would produce sugar in the human system. The product resulting from the above method contains a lower percentage of carbohydrates and the percentage of protein contained is raised to about 17%, which is higher than in the original bran, because of the removal of the carbohydrates while maintaining substantially the original amount of protein. The product has a beneficial laxative action due to its bulk and its insolubility in the human system. It is materially beneficial for persons suffering from diabetes and similar troubles, because, when mixed with other foods, it tends to keep them in a looser or more bulky condition, because of the insoluble and bulky nature of the product.

By reason of the absence of the undesirable or harmful elements present in the natural bran, it has no harmful effects. The material is more efficient as a natural laxative, because the laxative elements are retained while the harmful or undesirable elements, such as starch and certain other carbohydrates are removed. In other words, a given quantity of bran, which has been treated by my process, is more efficient as a laxative than the natural bran, because my product is 100% laxative, whereas the natural bran has 20% or more of material which is not only not laxative, but is harmful.

The product has the following characteristics:

It is dry, flaky, fibrous, light brown color and has about the following analysis:

| | Per cent. |
|---|---|
| Water | 5.00 |
| Proteins | 17.00 |
| Fat | 7.50 |
| Crude fiber | 22.00 |
| Starch | 0.00 |
| Sugars | 0.00 |
| Hemicellulose and organic phosphorous compounds | 48.50 |
| | 100.00 |

When boiled with water, it remains flaky and does not form a gelatinous mass; when treated with diastatic enzymes or with heat and acids, it will not produce dextrines or sugars. It is free of any dextrine or any sugar producing substances.

The method above set forth and illustrated by the examples given may be modified to a certain extent without departing from the spirit of my invention, and I therefore desire that it shall be understood that my invention is not limited to the exact steps set forth, as some slight variations may be made therein without departing from the spirit thereof.

I claim:—

1. A bran deprived of such of its constituents as would form sugars when taken into the human digestive system and retaining such of its constituents as have a laxative action in the human digestive system.

2. A substantially starch free bran, having approximately the following composition: water, 5%; proteins, 17; fat, 7.50; sugars, none; crude fiber, hemicellulose and organic phosphorous compounds, 70.50.

3. As a new article of manufacture, a dry, flaky bran free from elements which would form sugars in the human digestive system.

4. As a new article of manufacture, a starch free, sugar free cereal bran which when boiled with water will remain flaky and will not produce a gelatinous mass.

5. The method which consists in cooking bran until the starch cells thereof have been opened, mixing diastatic enzyme with said bran to convert the starch into dextrine and sugars, and washing the bran to remove the said dextrine and sugars.

6. The method which comprises cooking bran at approximately 100° C. until the starch cells thereof have been opened, rendering the starch water soluble by treating it with enzymes, and removing the soluble products.

JOKICHI TAKAMINE, Jr.